United States Patent [19]

Gold

[11] Patent Number: 4,959,806

[45] Date of Patent: Sep. 25, 1990

[54] APPROXIMATED ROTATIONAL SPEED SIGNAL FOR SHIFTING TRANSMISSION

[75] Inventor: Gary L. Gold, Schoolcraft, Mich.

[73] Assignee: Eaton Corporation, Cleveland, Ohio

[21] Appl. No.: 261,448

[22] Filed: Oct. 24, 1988

[51] Int. Cl.$^5$ .............................................. G01P 3/00
[52] U.S. Cl. .................................. 364/565; 364/424.1; 73/531
[58] Field of Search ............... 364/565, 424.1; 73/530, 73/531; 180/170, 178; 324/160, 168

[56] References Cited

U.S. PATENT DOCUMENTS 4,361,060 11/1982 Smyth ................................ 364/424.1
4,595,896 6/1986 Daubenspeck ....................... 342/373
4,648,290 3/1987 Dunkley et al. ................. 364/424.1

*Primary Examiner*—Parshotam S. Lall
*Assistant Examiner*—Michael Zanelli
*Attorney, Agent, or Firm*—A. E. Chrow

[57] ABSTRACT

A system is provided for approximating rotational speed of a oscillating rotational member such as a vehicular transmission input or output shaft (2). The system includes a rotational speed sensor (4) and a processor (6) operable to provide at an output signal ($S_{approx.}$) equal to at least one of signals ($S_3$, $S'_3$, $S_5$, $S'_5$ and $S_7 S'_7$) according to the number of speed measurements made by sensor (4) within a predetermined time period (T).

15 Claims, 3 Drawing Sheets

APPROXIMATED ROTATIONAL SPEED SIGNAL FOR SHIFTING TRANSMISSION

INTRODUCTION

This invention relates generally to a method and system for determining rotational speed of a rotating member such as a vehicular transmission input shaft and more particularly to a method and system for determining approximate rotational speed of a rotating member whose rotation is changing with time that, for example, is particularly advantageous for controlling optimum shifting points of the transmission change gears.

BACKGROUND OF THE INVENTION

Rotational speed is often used as a parameter for controlling certain functions. Such is particularly true when rotational speed of a vehicular engine and/or vehicular transmission input or output shaft is used to determine gear-shift points of an automatic or semi-automatic transmission.

Automatic and semi-automatic transmissions utilizing microprocessor controllers for processing speed output signals in accordance with predetermined logic rules to issue output command signals to system activators are known in the art of which examples are disclosed in U.S. Pat. Nos. 4,361,060; 4,595,986 and 4,648,290, the disclosures of which are incorporated herein by reference.

Rotational speed of a rotating member however is frequently not constant and may vary with time for a variety of reasons. Such variations in rotational speed (often characterized as "loping" or "oscillations") present a real problem in determining a mean or approximate speed for visual and more particularly for control purposes.

Variations in speed relative time results in the problem of having to determine an approximate or mean rotational speed from a plurality of discrete rotational speed values within a predetermined time period.

Although a simple arithmetic mean solution may be suitable for some purposes, a well known more accurate method for determining a mean or approximate value from an array of scattered data is the "method of least squares" which determines an estimated value of the instant value being examined according to the equation:

$$y = \frac{\sum_{i=1}^{N} (x_i - \bar{x})(y_i - \bar{y})}{\sum_{i=1}^{N} (x_i - \bar{x})^2} (x - \bar{x}) + \bar{y}$$

where:

$$\bar{x} = \frac{\sum_{i=1}^{N} x_i}{N}$$

$$\bar{y} = \frac{\sum_{i=1}^{N} y_i}{N}$$

The problem with this method however is that it involves complex calculations that are slow and time consuming.

In many applications, a rapid and accurate approximation of a mean value must be made which is particularly true on providing approximated mean rotational speed values of a rotating shaft for controlling optimum shifting points for vehicular transmission speed change gears.

In contrast to the above, the present invention establishes conditions by which the above equation is reduced to a family relatively simple linear equations for determining approximate rotational speed of a rotating member whose rotational speed may not be uniform and which can be rapidly determined by microprocessors well known to those skilled in the art.

DESCRIPTION OF SOME PREFERRED EMBODIMENTS

It is known from equation (3) on page 363 of "Computer Science; A First Course," John Wiley & Sons Inc., that:

$$y = \bar{y} + M(x - \bar{x})$$
$$= \bar{y} + Mx - M\bar{x}$$

which is the equation of a line with Slope M passing through point (x, y) where x and y are respective mean values and x and y are actual values.

It is further known from equation (4) on page 365 of the above-described reference that:

$$M = \frac{\sum_{i=1}^{N} (x_i - \bar{x})(y_i - \bar{y})}{\sum_{i=1}^{N} (x_i - \bar{x})^2}$$

which is the slope of a line passing through $(\bar{x}, \bar{y})$ for N number of values of x and y.

Locating the origin of orthogonal axis (x, y) at (x=o) and substituting M of equation (4) into equation (3) results in:

$$\bar{y} = \frac{\sum_{i=1}^{N} x_i y_i}{\sum_{i=1}^{N} x_i^2} (x) + \frac{\sum_{i=1}^{N} y_i}{N}$$

Where N is the number of values for x and y and $x=(N-1)/2$ is the number of values on respective sides of ordinate of the orthogonal (x, y) axis resulting in:

$$\bar{y} = \frac{\sum_{i=1}^{N} x_i y_i}{\sum_{i=1}^{N} x_i^2} \left( \frac{N-1}{2} \right) + \frac{\sum_{i=1}^{N} y_i}{N}$$

Letting N equal the number of speed measurements taken within a predetermined time period T and limiting N to odd whole integers greater than 1; and letting $t_n$=substantially equivalent incremental time periods within time period T such that $t_n = t_0, t_1, t_2 \ldots t_n$ and $(t_1-t_0)=(t_2-t_1)=(t_3-t_2)\ldots$; and substituting speed (s) for (y) and time (t) for (x) results in the basic equation;

$$\bar{s} = \frac{\sum_{i=1}^{N} t_i s_i}{\sum_{i=1}^{N} t_i^2} \left( \frac{N-1}{2} \right) + \frac{\sum_{i=1}^{N} s_i}{N}$$

Where $(N-1)/2$ is the even number of speed measurements on opposite sides of an orthogonal axis whose origin is located at the middle value for $t_n$ and whose ordinate is speed whose abscissa is time and for which $T_n$ has the value of zero at the origin with values of $T_n$ having opposite signs on opposite sides of the ordinate and the values of $s_n$ positive in all quadrants.

Figure 1:
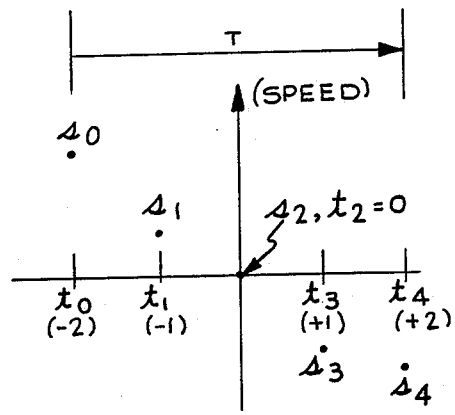
FIG. 1 is a graph of five rotational speed measurements respectively decreasing from left to right over a predetermined time period T.
Figure 2:
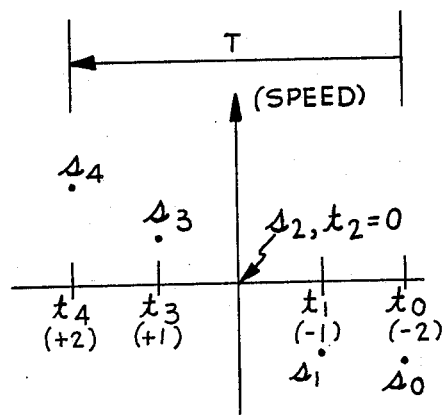
FIG. 2 is a graph of five rotational speed measurements respectively increasing from right to left over a predetermined time period T.

Application of the above equation is best illustrated by graphic examples in FIGS. 1 and 2 where, in FIG. 1, five speed values ($s_0$, $s_1$, $s_2$, $s_3$ and $s_4$) are respectively decreasing from left to right over time period T.

Note that $T_2$ at the origin is assigned the value of zero and that the values for $T_n$ to the left of the ordinate (speed) are negative and to the right of the ordinate (speed) are positive and that the increments of time along the abscissa are substantially equivalent.

Also note that N equals 5 which is an odd whole integer greater than 1 and that $(N-1)/2$ equals 2 which is an even integer equal to the number of speed measurements taken on opposite sides of the (speed) ordinate.

FIG. 2 is a graph of speed measurements versus time that are respectfully increasing from right to left over time period T.

The following pair of linear equivalents is provided by substituting the speed values $s_n$ and incremental time values $t_n$ into the basic equation with N=5 and $(N-1)/2=2$ which, for FIG. 2 results in:

$$S_{(approx.)} = \frac{3s_0 + 2s_1 + s_2 - s_4}{5}$$

and, for FIG. 1:

$$S_{(approx.)} = \frac{-s_0 + s_2 + 2s_3 + 3s_4}{5}$$

Thus, a pair of simple linear equations are provided for approximating speed (S approx.) over a predetermined time period T.

Similarly, where N=3 and $(N-1)/2=1$, it is found that the solution pairs are:

$$S_{(approx.)} = \frac{-s_0 + 2s_1 + 5s_2}{6}$$

and $$S_{(approx.)} = \frac{5s_0 + 2s_1 - s_2}{6}$$

Likewise, it is found when N=7 and $(N-1)/2=3$, the solution pairs are:

$$S_{(approx.)} = \frac{-5s_0 - 2s_1 + s_2 + 4s_3 + 7s_4 + 10s_5 + 13s_6}{7}$$

and $$S_{(approx.)} = \frac{13s_0 + 10s_1 + 7s_2 + 4s_3 + s_4 - 2s_5 - 5s_6}{7}$$

The above linear equations enable rapid calculations by a microprocessor which is extremely advantageous for control purposes such as hereinafter described with respect to FIG. 3.

Figure 3:
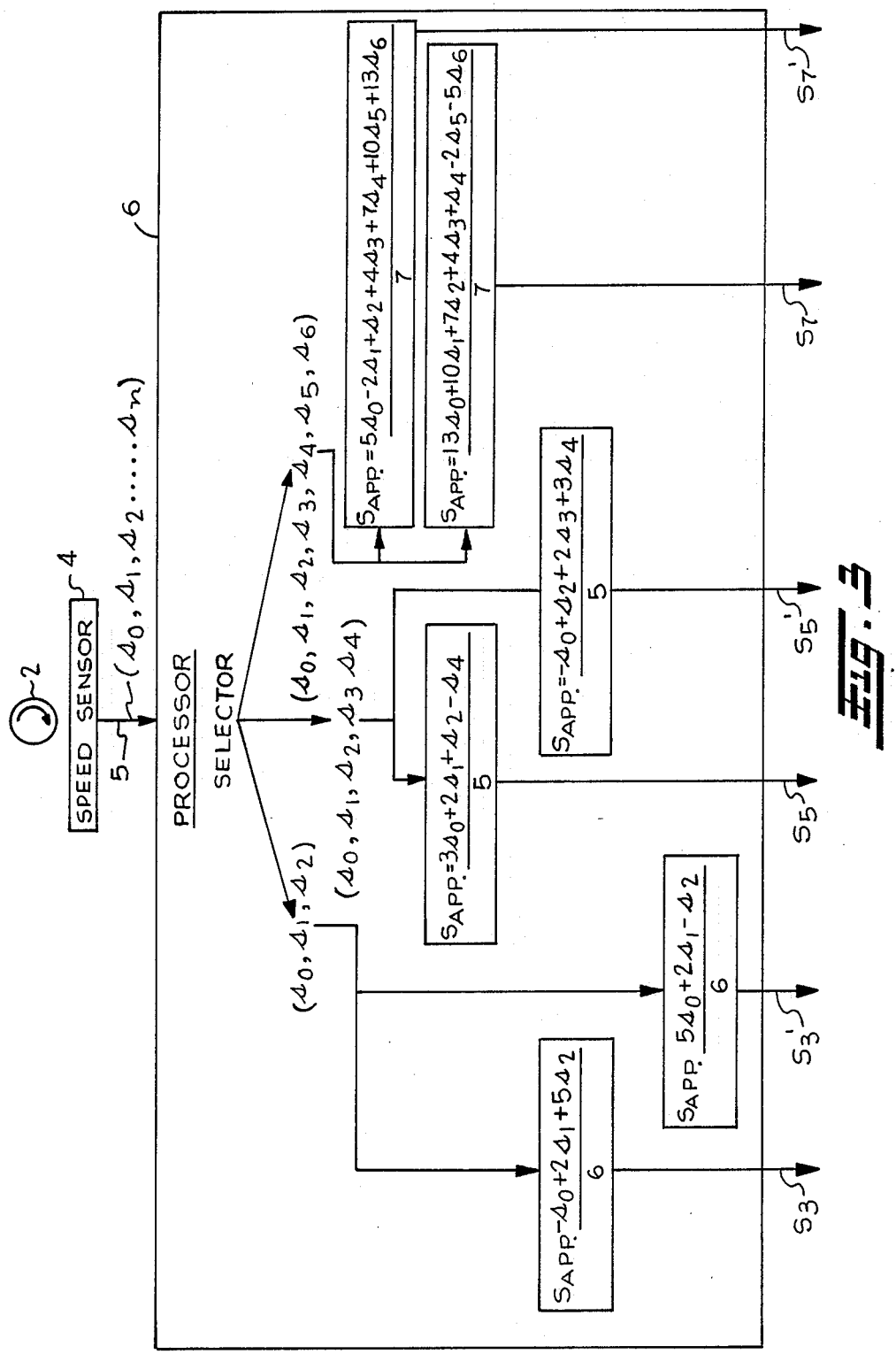
FIG. 3 is a block diagram of an embodiment of the system of the invention.

In FIG. 3, a system is provided for approximating rotational speed of a rotating shaft 2 such as an input shaft of a vehicular transmission.

The system includes a speed sensor 4 and processor 6. Speed sensor 4 may be any type of sensor able to sense and transmit a signal 5 of rotational speed values ($s_0$, $s_1$, $s_2$, $s_3 \ldots s_n$) of shaft 2 within a predetermined time period T which may be in the order of micro-seconds. Hall-Effect magnetic sensors are but one way to measure rotational speed known to those skilled in the art.

Signal 5 is received by processor 6 which is of the type well known to those skilled in the art operable to receive signal 5 and select certain values therefrom and perform the simple linear arithmetic calculations shown in FIG. 3.

Thus, for example, where speed measurements ($s_0$, $s_1$ and $s_2$) are selected, they are processed according to the equation:

$$S_{(approx.)} = \frac{-s_0 + 2s_1 + 5s_2}{6}$$

to provide output signal $s_3$ therefrom.

Although processor 6 is shown in FIG. 3 as being capable of performing six calculations, such as for illustrative purposes for it may process and provide only one or any combination of output signals $s_3$, $s_3'$, $s_5$, $s_5'$, $s_7$ and $s_7'$ which may be utilized as signal for controlling optimum shifting points of vehicular transmission change gears being driven by shaft 2.

Although processor 6 is shown in FIG. 3 as selecting certain speed values, such may be done by speed sensor 4 by selecting and transmitting only those rotational speed values for which processor 6 is adapted to make the particular linear calculations hereinbefore set forth.

Figure 4:
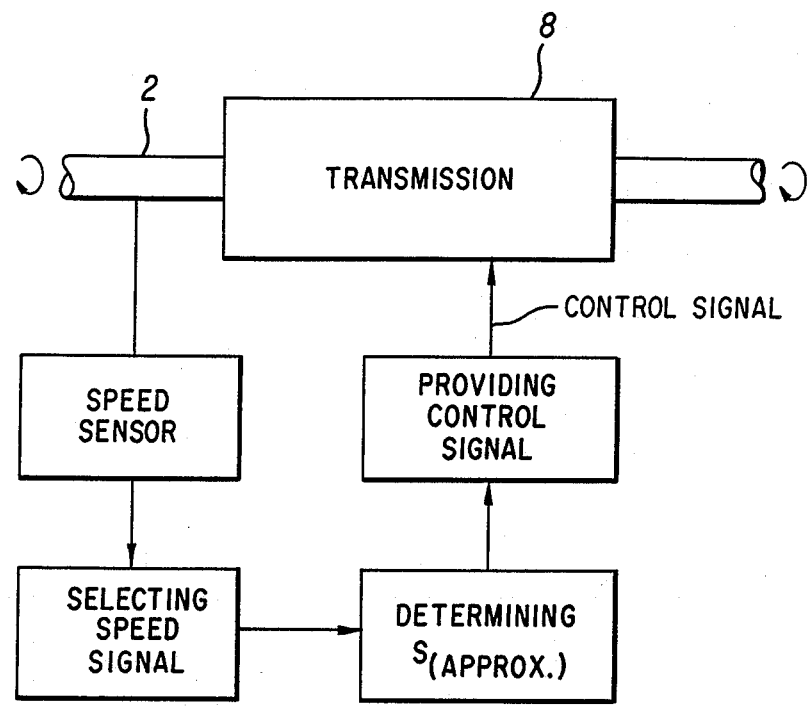
FIG. 4 is a generalized block diagram of the system of the invention.

FIG. 4 shows a generalized block diagram of the system of the invention in which varying rotational speeds of the input or output shaft 2 of vehicular transmission are first measured by a speed sensor afterwhich certain speeds are selected, as previously described, afterwhich an S (approx.) is determined that in turn provides a control signal for controlling optimum shifting points of the transmission change gears.

What is claimed is:

1. A linear method for determining approximate mean rotational speed of a rotating member for controlling shifting points of a vehicular transmission, said method including the steps of:

(a) determining a desired array of linear equivalents for the equation:

$$S_{(approx.)} = \frac{\Sigma t_n s_n}{\Sigma t_n^2} \left( \frac{N-1}{2} \right) + \frac{\Sigma s_n}{N}$$

Wherein N is an odd whole integer greater than one and equals the number of speed measurements taken within a predetermined time period T;

$t_n$ equals selected incremental time periods within time period T at which rotational speed $s_n$ of the rotating member is measured such that $t_n = t_o, t_1, t_2, t_3 \ldots$ and $(t_1-t_o)=(t_2-t_1)=(t_3-t_2\ldots)$;

$s_n$ are the individual speed measurements taken within time period T where $s_n = s_1, s_2, s_3 \ldots s_n$;

(N−1/2) is the even number of speed measurements on opposite sides of an orthogonal axis whose origin is located at the middle value of $t_n$ and whose ordinate is speed and whose abscissa is time and for which $t_n$ has the value of zero at the origin with values of $t_n$ having opposite signs on opposite sides of the ordinate and the value of $s_n$ is positive in all quadrants;

(b) selecting a desired linear equivalent for $S_{(approx.)}$ from the array of step (a), (c) measuring and providing signals indicative of the rotational speed values $s_n$ of the rotating member according to the linear equivalent selected for $S_{(approx.)}$ at step (b);

(d) determining $S_{(approx.)}$ by processing the speed signals of step (c) according to the linear equivalent selected therefor at step, (e) providing a signal corresponding to S(approx.) step (d), and (f) controlling the shifting points of the transmission with the signal of step (e).

2. The method of claim 1 wherein N=3 and (N−1)/2=1 and $$S_{(approx.)} = \frac{-s_0 + 2s_1 + 5s_2}{6}$$

3. The method of claim 1 wherein N=3 and (N−1)/2=1 and $$S_{(approx.)} = \frac{5s_0 + 2s_1 - s_2}{6}$$

4. The method of claim 1 wherein N=5 and (N−1)/2=2 and $$S_{(approx.)} = \frac{3s_0 + 2s_1 + s_2 - s_4}{5}$$

5. The method of claim 1 wherein N=5 and (N−1)/2=2 and $$S_{(approx.)} = \frac{-s_0 + s_2 + 2s_3 + 3s_4}{5}$$

6. The method of claim 1 wherein N=7 and (N−1)/2=3 and $$S_{(approx.)} = \frac{-5s_0 - 2s_1 + s_2 + 4s_3 + 7s_4 + 10s_5 + 13s_6}{7}$$

7. The method of claim 1 wherein N=7 and (N−1)/2=3 and $$S_{(approx.)} = \frac{13s_0 + 10s_1 + 7s_2 + 4s_3 + s_4 - 2s_5 - 5s_6}{7}$$

8. A linear method for determining approximate mean rotational speed of a rotating member for controlling shifting points of a vehicular transmission, said method including the steps of;

(a) measuring and providing a signal corresponding to the rotational speed of the rotating member, (b) selecting five values ($s_0, s_1, s_2, s_3, s_4$) of the speed signal at selected time increments therebetween within a predetermined time period, (c) determining the approximate mean rotational speed $S_{(approx.)}$ by processing the signals of step (b) according to a selected one of the equations:

$$S_{(approx.)} = \frac{-s_0 + s_2 + s_3 + 3s_4}{5}$$

and $$S_{(approx.)} = \frac{3s_0 + 2s_1 + s_3 - s_4}{5}$$

(d) providing a signal corresponding to a selected on of S(approx.) of step (c), and (e) controlling the shifting points of the transmission with the signal of step (d).

9. The method of claims 1 or 8 wherein the rotating member is a vehicular shaft.

10. The method of claim 9 wherein the shaft is a transmission input shaft.

11. A system for determining approximate mean rotational speed of a rotating member for controlling shifting points of a vehicular transmission, said system comprising;

speed sensing means, said means operative to measure and provide a signal indicative of the rotational speed of the rotating member, means for selecting three value ($s_0, s_1, s_2$) of the speed signal at selected time increments therebetween within a predetermined time period, means for processing the selected speed value to determine the approximate mean rotational speed $S_{(approx.)}$ according to one of the equations:

$$S_{(approx.)} = \frac{-s_0 + 2s_1 + 5s_2}{6}$$

and $$S_{(approx.)} = \frac{5s_0 + 2s_1 - s_2}{6}$$

means for providing a signal corresponding to a selected one of S(approx.), and means for controlling the shifting points of the transmission with the S(approx.) signal selected.

12. A system for determining approximate mean rotational speed of a rotating member for controlling shifting points of a vehicular transmission, said system comprising;

speed sensing means, said means operative to measure and provide a signal indicative of the rotational speed of rotating member, means for selecting five values ($s_0, s_1, s_2, s_3, s_4$) of the speed signal at selected increments therebetween within a predetermined time period, means for processing the selected speed values to determine approximate mean rotational speed $S_{(approx.)}$ according to one of the equations:

$$S_{(approx.)} = \frac{3s_0 + 2s_1 + s_2 - s_4}{5}$$

and $$S_{(approx.)} = \frac{-s_0 + s_2 + 2s_3 + 3s_4}{5}$$

means for providing a signal corresponding to a selected on of S(approx.), and means for controlling the shifting points of the transmission with the S(approx.) signal selected.

13. A system for determining approximate mean rotational speed of a rotating member for controlling shifting points of a vehicular transmission, said system comprising;

speed sensing means, said means operative to measure and provide a signal indicative of the rotational speed of the rotating member, means for selecting seven values ($s_0, s_1, s_2, s_3, s_4, s_5, s_6$) of the speed signal at selected time increments therebetween within a predetermined time period, means for processing the selected speed values to determine the approximate mean rotational speed $S_{(approx.)}$ according to one of the equations:

$$S_{(approx.)} = \frac{5s_0 - 2s_1 + s_2 + 4s_3 + 7s_4 + 10s_5 + 13s_6}{7}$$

$$S_{(approx.)} = \frac{13s_0 + 10s_1 + 7s_2 + 4s_3 + s_4 - 2s_5 - 5s_6}{7}$$

means for providing a signal corresponding to a selected one of S(approx.), and means for controlling the shifting points of the transmission with the S(approx.) signal selected.

14. The system of claims 11, 12 or 13 wherein the rotating member is a vehicular engine shaft.

15. The system of claim 14 wherein the shaft is a transmission input shaft.

* * * * *